US012631836B2

(12) United States Patent
Ho et al.

(10) Patent No.:  US 12,631,836 B2
(45) Date of Patent:     May 19, 2026

(54) OPTICAL COUPLING MODULE AND MANUFACTURING METHOD THEREOF HAVING CONJOINED TAPERED ELEMENTS

(71) Applicant: Industrial Technology Research Institute, Hsinchu (TW)

(72) Inventors: Tsung-Jun Ho, Tainan City (TW); Yu-Cheng Song, Tainan City (TW); Kuo-Teng Tsai, Penghu County (TW); Ying-Hui Yang, Kaohsiung City (TW)

(73) Assignee: Industrial Technology Research Institute, Hsinchu (TW)

( * ) Notice: Subject to any disclaimer, the term of this patent is extended or adjusted under 35 U.S.C. 154(b) by 402 days.

(21) Appl. No.: 18/512,017

(22) Filed: Nov. 17, 2023

(65) Prior Publication Data

US 2025/0110296 A1       Apr. 3, 2025

(30) Foreign Application Priority Data

Oct. 3, 2023    (TW) ................................. 112137916

(51) Int. Cl.
G02B 6/42              (2006.01)

(52) U.S. Cl.
CPC .................................. G02B 6/4249 (2013.01)

(58) Field of Classification Search
CPC .... G02B 6/4249; G02B 6/0006; B23K 9/007; B23K 9/04
See application file for complete search history.

(56) References Cited

U.S. PATENT DOCUMENTS 5,412,745 A * 5/1995 Weidman ............. G02B 6/2835
                                                          385/127
7,840,107 B2 * 11/2010 Tanigawa ........... G02B 6/02042
                                                          359/341.32

(Continued)

FOREIGN PATENT DOCUMENTS

CN          102891429          1/2013
CN          102879860          11/2014

(Continued)

OTHER PUBLICATIONS

Zhixian Li et al., "Investigation of the pump coupling efficiency of a side-pumping combiner based on tapered-fused method", Optics Express, Jun. 7, 2021, pp. 17784-17794, vol. 29, No. 12.

(Continued)

*Primary Examiner* — Andrew Jordan
(74) *Attorney, Agent, or Firm* — JCIPRNET

(57)                ABSTRACT

An optical coupling module, including a transmission optical fiber and at least one pump optical fiber, is provided. The transmission optical fiber has a central shaft extending along a longitudinal direction and includes a first transmission flat portion, a second transmission flat portion, and a transmission tapered portion. The transmission tapered portion is connected between the first transmission flat portion and the second transmission flat portion. The at least one pump optical fiber extends along the longitudinal direction and includes a pump flat portion and a pump tapered portion. The pump flat portion is disposed on the first transmission flat portion. The pump tapered portion is connected to the pump flat portion. A distance from an outer surface of the pump tapered portion to the central shaft gradually decreases from adjacent to the pump flat portion toward a direction away from the pump flat portion.

19 Claims, 8 Drawing Sheets

(56) References Cited

U.S. PATENT DOCUMENTS

| | | | | |
|---|---|---|---|---|
| 7,991,255 B2 * | 8/2011 | Salokatve | ............ | G02B 6/2835 |
| | | | | 65/408 |
| 8,582,608 B2 | 11/2013 | Gapontsev et al. | | |
| 8,744,224 B2 * | 6/2014 | Wysocki | ................. | G02B 6/04 |
| | | | | 359/341.1 |
| 8,979,396 B2 | 3/2015 | Wiley | | |
| 9,097,853 B2 * | 8/2015 | Theeg | .................. | G02B 6/2835 |
| 11,417,998 B2 | 8/2022 | Temyanko et al. | | |
| 11,448,825 B2 | 9/2022 | Zheng et al. | | |
| 11,592,620 B1 * | 2/2023 | Hsia | ..................... | G02B 6/2835 |
| 2007/0212006 A1 * | 9/2007 | Wysocki | .................. | G02B 6/04 |
| | | | | 385/115 |
| 2008/0107382 A1 | 5/2008 | Griffin | | |
| 2009/0154879 A1 * | 6/2009 | Salokatve | ............ | G02B 6/2835 |
| | | | | 264/1.25 |
| 2013/0287338 A1 | 10/2013 | Majid et al. | | |
| 2023/0251426 A1 | 8/2023 | Hsia et al. | | |
| 2024/0250493 A1 * | 7/2024 | Zhu | ........................... | G02B 6/04 |
| 2025/0110296 A1 * | 4/2025 | Ho | ......................... | B23K 9/007 |

FOREIGN PATENT DOCUMENTS

| | | | | |
|---|---|---|---|---|
| CN | 101405635 | | 6/2015 | |
| CN | 103545704 | | 7/2016 | |
| CN | 107870391 | | 4/2018 | |
| CN | 105281186 | | 6/2018 | |
| CN | 109494554 | | 3/2019 | |
| CN | 109494554 A * | 3/2019 | ......... | H01S 3/06708 |
| CN | 105633778 | | 5/2019 | |
| CN | 113809625 | | 2/2022 | |
| CN | 115718372 | | 2/2023 | |
| TW | 202102887 | | 1/2021 | |

OTHER PUBLICATIONS

Qirong Xiao et al., "A Side-Pump Coupler With Refractive Index Valley Configuration for Fiber Lasers and Amplifiers", Journal of Lightwave Technology, Aug. 15, 2013, pp. 2715-2722, vol. 31, No. 16.

Chengmin Lei et al., "Theoretical analysis of fused tapered side-pumping combiner for all-fiber lasers and amplifiers", Laser Technology for Defense and Security XIII, Proc. of SPIE, May 1, 2017, pp. 101920N-1-101920N-8, vol. 10192.

"Office Action of Taiwan Counterpart Application", issued on Jul. 12, 2024, p. 1-p. 7.

* cited by examiner

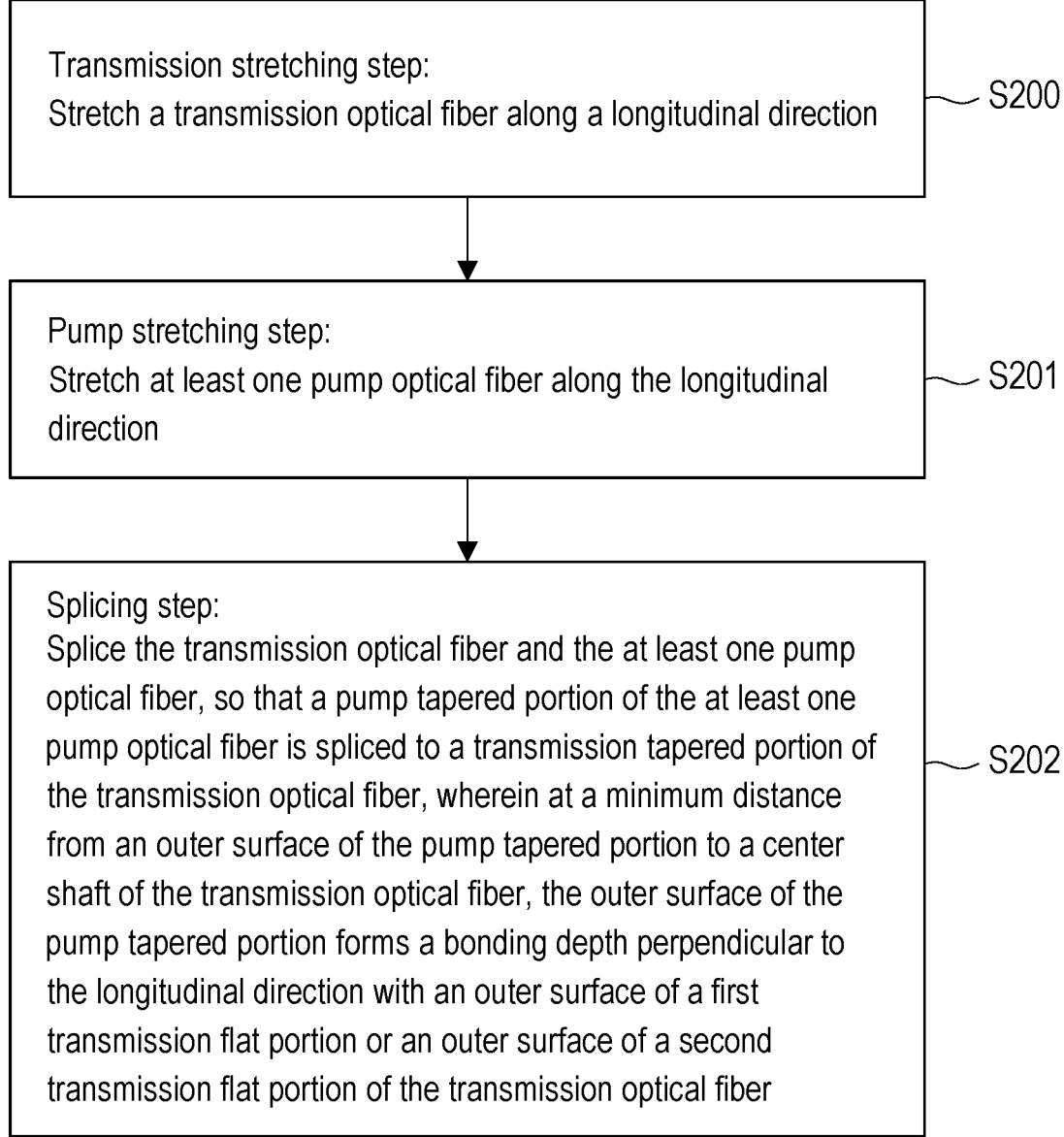

Transmission stretching step:
Stretch a transmission optical fiber along a longitudinal direction — S200

Pump stretching step:
Stretch at least one pump optical fiber along the longitudinal direction — S201

Splicing step:
Splice the transmission optical fiber and the at least one pump optical fiber, so that a pump tapered portion of the at least one pump optical fiber is spliced to a transmission tapered portion of the transmission optical fiber, wherein at a minimum distance from an outer surface of the pump tapered portion to a center shaft of the transmission optical fiber, the outer surface of the pump tapered portion forms a bonding depth perpendicular to the longitudinal direction with an outer surface of a first transmission flat portion or an outer surface of a second transmission flat portion of the transmission optical fiber — S202

OPTICAL COUPLING MODULE AND MANUFACTURING METHOD THEREOF HAVING CONJOINED TAPERED ELEMENTS

CROSS-REFERENCE TO RELATED APPLICATION

This application claims the priority benefit of Taiwan application serial no. 112137916, filed on Oct. 3, 2023. The entirety of the above-mentioned patent application is hereby incorporated by reference herein and made a part of this specification.

TECHNICAL FIELD

The disclosure relates to an optical module and a manufacturing method thereof, and in particular to an optical coupling module and a manufacturing method thereof.

BACKGROUND

In the current technology for splicing optical fibers, the processing manner of continuous burning with oxyhydrogen flame is mainly used for fusing. However, this technology has the issue of uneven temperature field, which causes insufficient processing precision to further construct the detailed structures of the optical fibers, resulting in poor processing yield. In addition, the conventional optical coupling module produced by the processing manner of continuous burning with oxyhydrogen flame has lateral light leakage, thereby causing poor optical coupling efficiency.

SUMMARY

An optical coupling module and a manufacturing method thereof, which can reduce lateral light leakage and increase coupling area, thereby increasing output laser energy density, is introduced herein.

The disclosure provides an optical coupling module, which includes a transmission optical fiber and at least one pump optical fiber. The transmission optical fiber has a center shaft extending along a longitudinal direction. The transmission optical fiber includes a first transmission flat portion, a second transmission flat portion, and a transmission tapered portion. The transmission tapered portion is connected between the first transmission flat portion and the second transmission flat portion. An average outer diameter of the transmission tapered portion is less than outer diameters of the first transmission flat portion and the second transmission flat portion, respectively. The at least one pump optical fiber extends along the longitudinal direction. The at least one pump optical fiber includes a pump flat portion and a pump tapered portion. The pump flat portion is disposed on the first transmission flat portion. The pump tapered portion is connected to the pump flat portion. A distance from an outer surface of the pump tapered portion to the center shaft gradually decreases from adjacent to the pump flat portion toward a direction away from the pump flat portion. The pump tapered portion is spliced to the transmission tapered portion, and at a minimum distance from the outer surface of the pump tapered portion to the center shaft, the outer surface of the pump tapered portion has a bonding depth perpendicular to the longitudinal direction with an outer surface of a first transmission flat portion or an outer surface of the second transmission flat portion. The disclosure also provides a manufacturing method of an optical coupling module, which includes the following steps. In a transmission stretching step, a transmission optical fiber is stretched along a longitudinal direction. In a pump stretching step, at least one pump optical fiber is stretched along the longitudinal direction. In a splicing step, the transmission optical fiber and the at least one pump optical fiber are spliced, so that a pump tapered portion of the at least one pump optical fiber is spliced to a transmission tapered portion of the transmission optical fiber. At a minimum distance from an outer surface of the pump tapered portion to a center shaft of the transmission optical fiber, the outer surface of the pump tapered portion forms a bonding depth perpendicular to the longitudinal direction with an outer surface of a first transmission flat portion or an outer surface of a second transmission flat portion of the transmission optical fiber.

Based on the above, in the optical coupling module and the manufacturing method thereof of the disclosure, the transmission optical fiber and the at least one pump optical fiber are stretched along the longitudinal direction, and the pump tapered portion of the pump optical fiber and the transmission tapered portion of the transmission optical fiber are spliced, so that the outer surface with the smallest outer diameter in the pump tapered portion of the pump optical fiber has the bonding depth perpendicular to the longitudinal direction with an outer surface of a first transmission flat portion or the outer surface of the second transmission flat portion of the transmission optical fiber. In this way, the lateral light leakage can be reduced and the coupling area can be increased, thereby increasing the output laser energy density of the optical coupling module.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

FIG. 3 is a flowchart of a manufacturing method of an optical coupling module according to an embodiment of the disclosure.

DETAILED DESCRIPTION OF DISCLOSURED EMBODIMENTS

Figure 1:
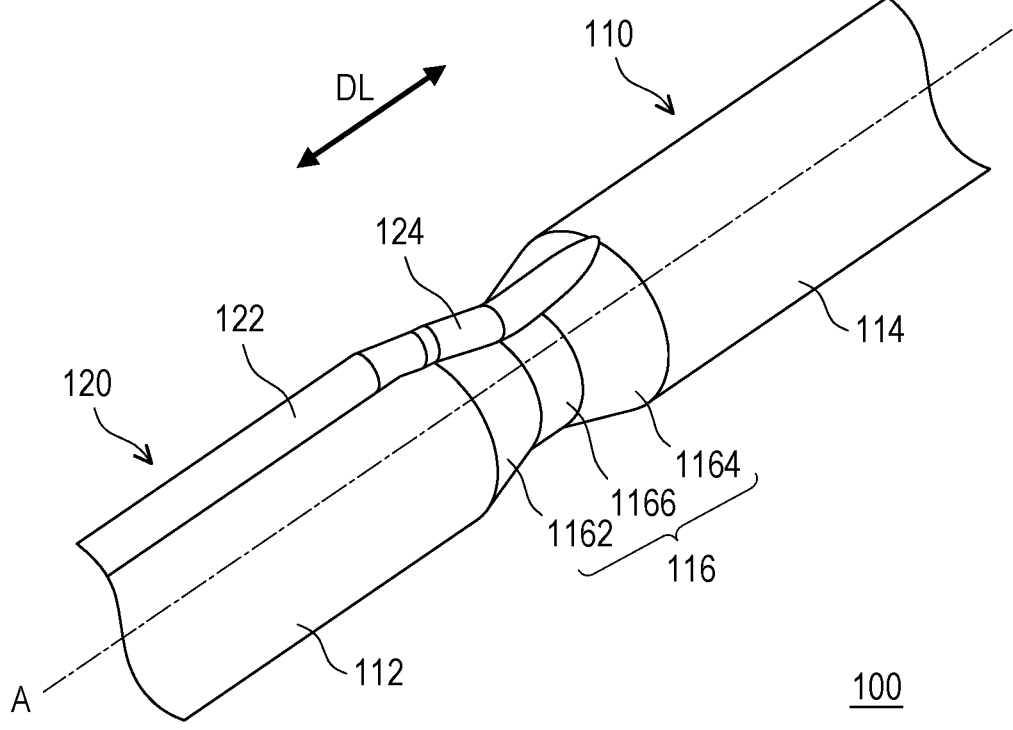
FIG. 1 is a schematic view of an optical coupling module according to an embodiment of the disclosure.
Figure 2A:
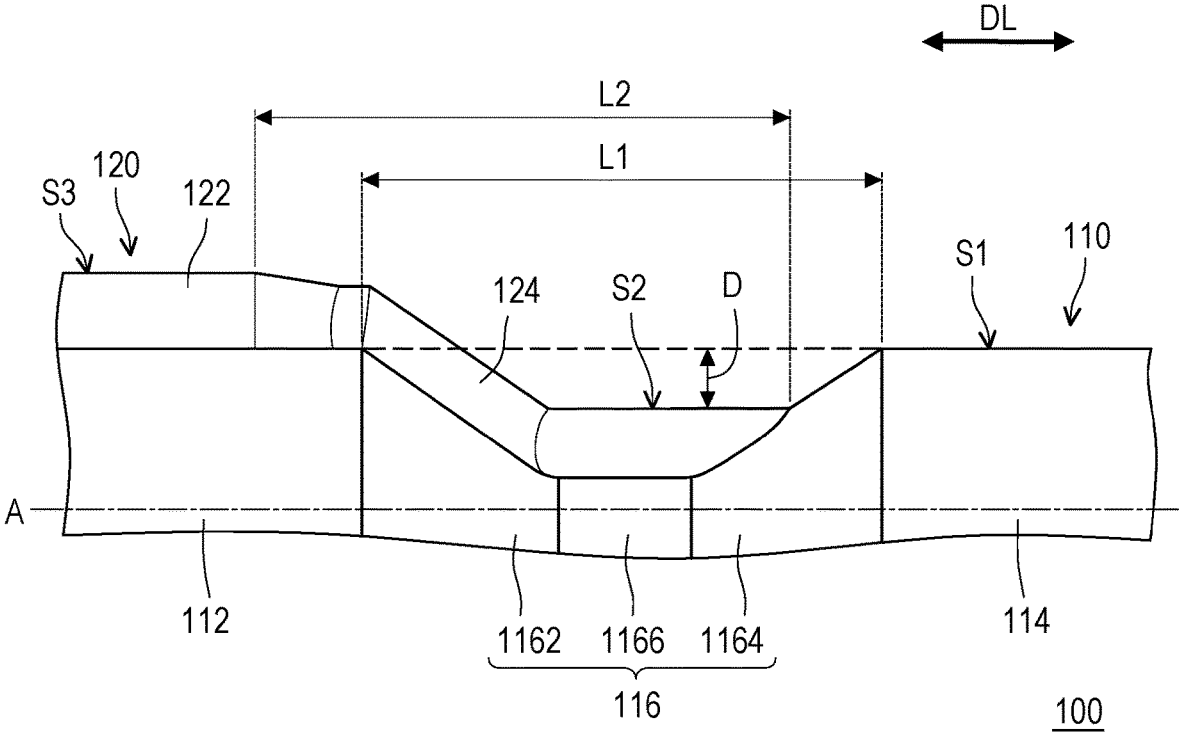
FIG. 2A is a schematic side view of the optical coupling module according to the embodiment of FIG. 1.
Figure 2B:
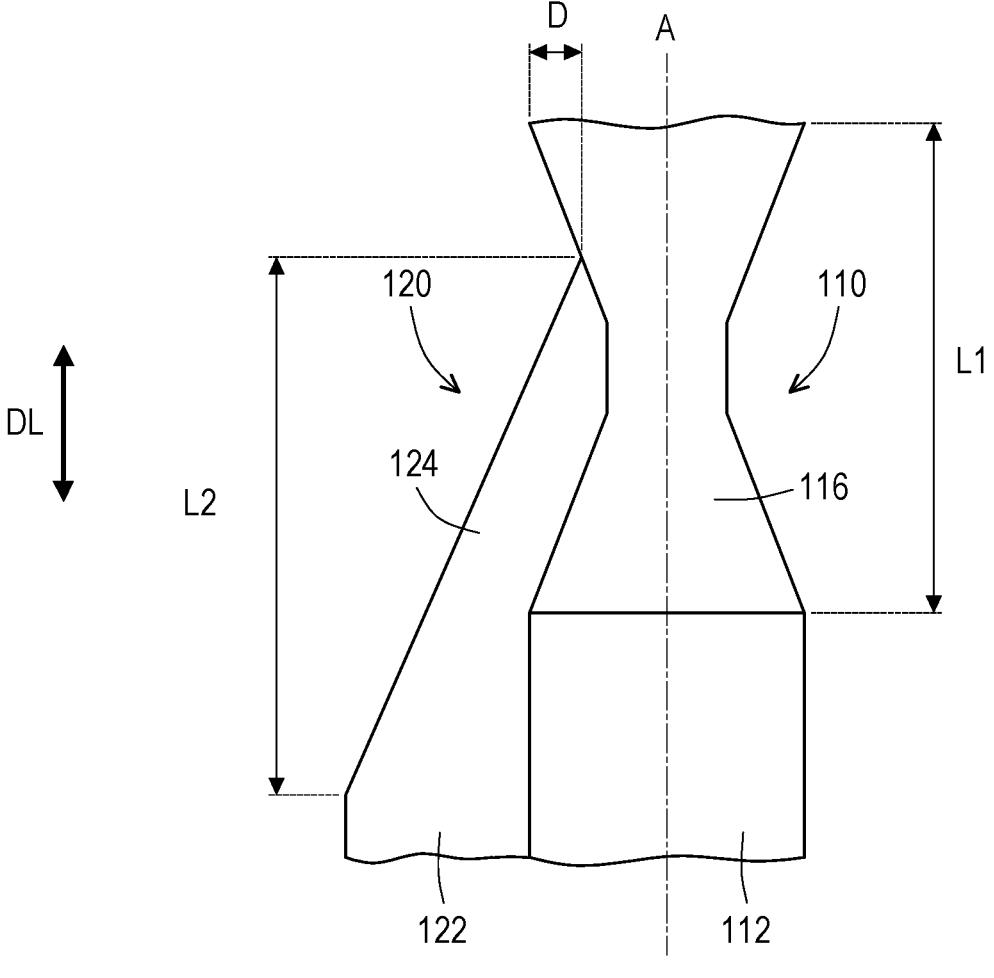
FIG. 2B is another schematic side view of the optical coupling module according to the embodiment of FIG. 1.

FIG. 1 is a schematic view of an optical coupling module according to an embodiment of the disclosure. FIG. 2A is a schematic side view of the optical coupling module according to the embodiment of FIG. 1. FIG. 2B is another schematic side view of the optical coupling module according to the embodiment of FIG. 1. Please refer to FIG. 1 to FIG. 2B. The disclosure provides an optical coupling module 100 for transmitting a laser beam and having optimal output energy density. For example, the optical coupling module 100 may be applied to semiconductor laser and fiber laser as light combining architecture for optimizing laser beam quality. The optical coupling module 100 includes a transmission optical fiber 110 and at least one pump optical fiber 120, wherein the pump optical fiber 120 is disposed on the transmission optical fiber 110, the transmission optical fiber 110 has a center shaft A, and the transmission optical fiber 110 and the pump optical fiber 120 both extend along a longitudinal direction DL. In other words, the transmission optical fiber 110 and the pump optical fiber 120 are disposed in parallel. In the embodiment, the transmission optical fiber 110 is disposed on the pump optical fiber 120. In the embodiment, the number of the at least one pump optical fiber 120 is, for example, one. However, in different embodiments, the number of the at least one pump optical fiber 120 may be multiple, which are evenly distributed on an outer surface of the transmission optical fiber 110 in a direction perpendicular to the longitudinal direction DL (see FIG. 5).

The transmission optical fiber 110 includes a first transmission flat portion 112, a second transmission flat portion 114, and a transmission tapered portion 116. The transmission tapered portion 116 is connected between the first transmission flat portion 112 and the second transmission flat portion 114, and an average outer diameter of the transmission tapered portion 116 is less than outer diameters of the first transmission flat portion 112 and the second transmission flat portion 114 respectively. In detail, the transmission tapered portion 116 includes a first tapered area 1162, a second tapered area 1164, and a flat area 1166 which connected to the first tapered area 1162 and the second tapered area 1164, wherein the first tapered area 1162 and the first transmission flat portion 112 are connected, the second tapered area 1164 and the second transmission flat portion 114 are connected, and an outer diameter of the flat area 1166 is less than outer diameters of the first tapered area 1162 and the second tapered area 1164 respectively. Specifically, the outer diameter of the first tapered area 1162 gradually decreases from the first transmission flat portion 112 toward the flat area 1166, and the outer diameter of the second tapered area 1164 gradually decreases from the second transmission flat portion 114 toward the flat area 1166. In the embodiment, an outer surface of the transmission tapered portion 116 has a transmission taper slope, and a slope value thereof is between 0.19 and 0.25. In other words, the flat area 1166 has the smallest outer diameter of the entire transmission optical fiber 110. However, in different embodiments, the disclosure does not limit actual geometric changes in the appearance of the transmission tapered portion 116.

Each of the at least one pump optical fiber 120 includes a pump flat portion 122 and a pump tapered portion 124. The pump flat portion 122 is disposed on the first transmission flat portion 112 of the transmission optical fiber 110. The pump tapered portion 124 is connected to the pump flat portion 122, and an outer diameter of the pump tapered portion 124 gradually decreases from adjacent to the pump flat portion 122 toward a direction away from the pump flat portion 122. In the embodiment, there is no spacing between the transmission tapered portion 116 and the pump tapered portion 124. That is, the pumping taper portion 124 is directly in close contact with the transmission tapered portion 116. In the embodiment, an outer surface of the pump tapered portion 124 has a pump taper slope, and a slope value thereof is between 0.05 and 0.14. In the embodiment, a length L2 of the pump tapered portion 124 in the longitudinal direction DL is greater than a length L1 of the transmission tapered portion 116 in the longitudinal direction DL. It is worth mentioning that the pump tapered portion 124 is spliced to the transmission tapered portion 116 of the transmission optical fiber 110, and at the minimum distance from an outer surface S2 of the pump tapered portion 124 to the center shaft A, the outer surface S2 of the pump tapered portion 124 has a bonding depth D perpendicular to the longitudinal direction DL with an outer surface S1 of the second transmission flat portion 114 or an outer surface S3 of the first transmission flat portion 112, and the bonding depth D is greater than 0 km. In the embodiment, the bonding depth D is greater than 0 m and less than or equal to 50 km. Therefore, when a light beam is continuously transmitted from the pump flat portion 122 of the pump optical fiber 120 toward the pump tapered portion 124, the light beam is more easily transmitted from the pump tapered portion 124 into the transmission tapered portion 116 of the transmission optical fiber 110, and then transmitted toward the second transmission flat portion 114 of the transmission optical fiber 110. In this way, light leakage can be reduced (for example, light leakage can be reduced by 30%) to reduce lateral light leakage and increase coupling area, thereby increasing output laser energy density of the optical coupling module 100.

Figure 4:
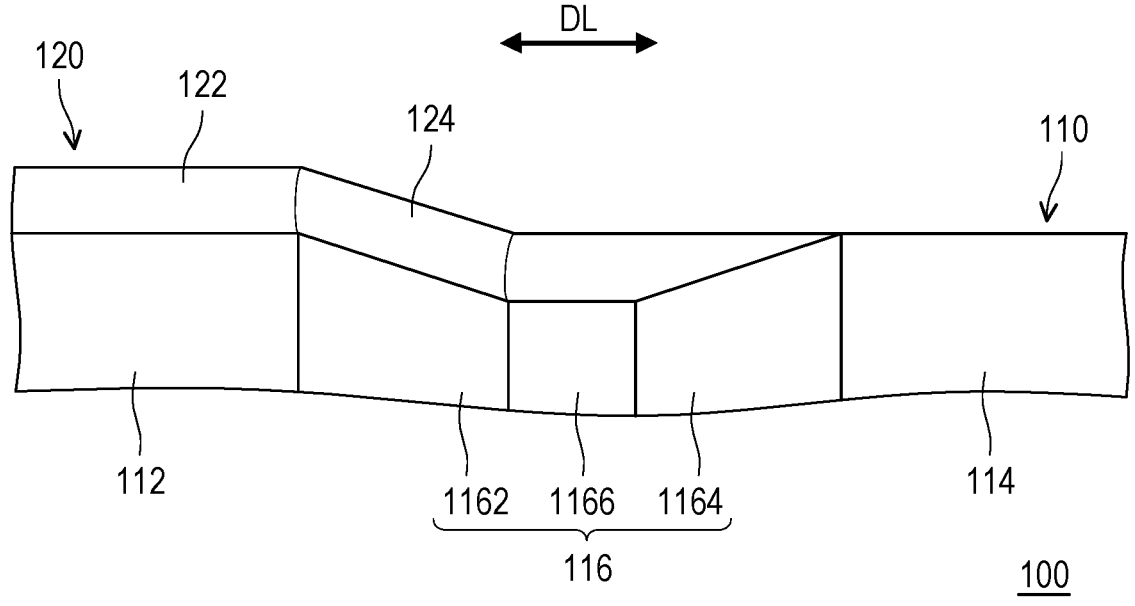
FIG. 4 is a schematic side view of an optical coupling module not performed with a splicing process according to an embodiment of the disclosure.

FIG. 3 is a flowchart of a manufacturing method of an optical coupling module according to an embodiment of the disclosure. FIG. 4 is a schematic side view of an optical coupling module not performed with a splicing process according to an embodiment of the disclosure. The embodiment provides a manufacturing method of an optical coupling module, which may at least be applied to the optical coupling module 100 shown in FIG. 1, FIG. 2A, and FIG. 2B that is taken as an example in the following description, and FIG. 4 shows the optical coupling module 100 that has not yet been performed with splicing processing. Please refer to FIG. 1 to FIG. 4. In the manufacturing method of the optical coupling module 100 of the embodiment, first, Step S200 is executed to perform a transmission stretching step of stretching the transmission optical fiber 110 along the longitudinal direction DL. Then, Step S201 is executed to perform a pump stretching step of stretching the at least one pump optical fiber 120 along the longitudinal direction DL. In different embodiments, Step S200 and Step S201 may be performed in an exchanged order or at the same time, but the disclosure is not limited thereto. In other words, Step S200 and Step S201 are steps for stretching the transmission optical fiber 110 and/or the at least one pump optical fiber 120. Finally, Step S202 is executed to perform a splicing step of splicing the at least one pump optical fiber 120 and the transmission optical fiber 110, so that the pump tapered portion 124 of the at least one pump optical fiber 120 is spliced to the transmission tapered portion 116 of the transmission optical fiber 110, wherein at the minimum distance from the outer surface S2 of the pump tapered portion 124 to the center shaft A, the outer surface S2 of the pump tapered portion 124 forms the bonding depth D perpendicular to the longitudinal direction DL with an outer surface S3 of the first transmission flat portion 112 or the outer surface S1 of the second transmission flat portion 114. That is, Step S202 is the step of performing bonding processing on the transmission optical fiber 110 and the at least one pump optical fiber 120, and the preparation of the optical coupling module 100 is completed.

Figure 5:
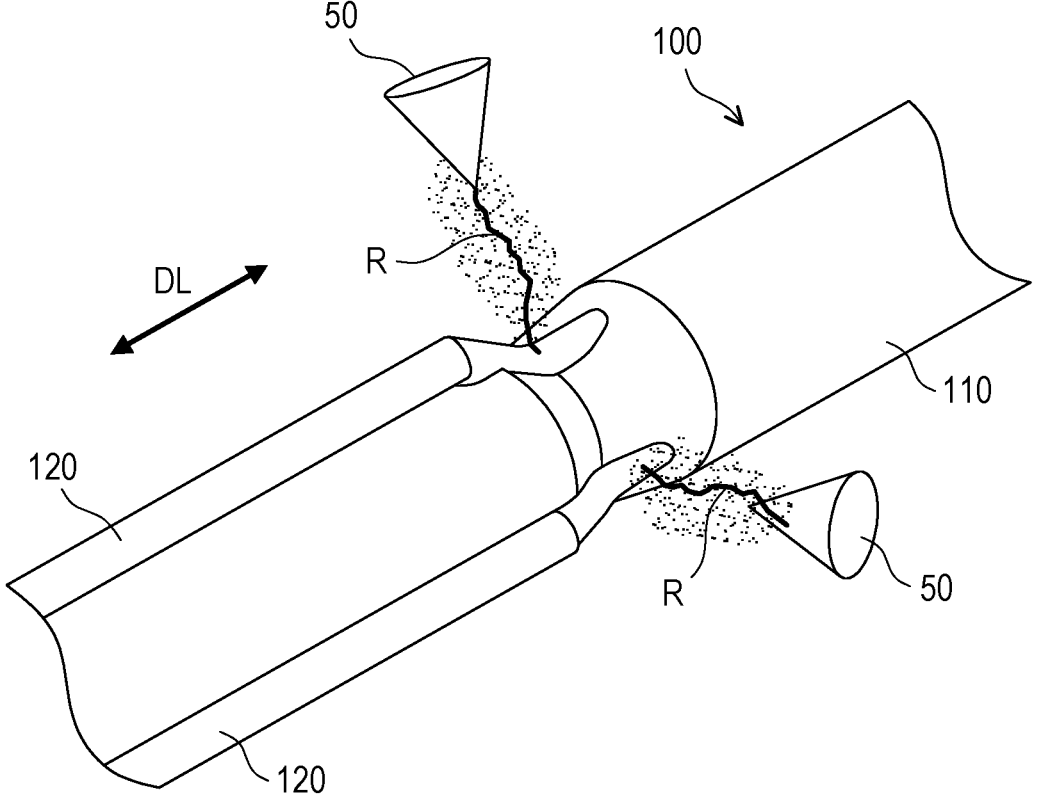
FIG. 5 is a schematic view of an arc discharge device processing an optical coupling module according to an embodiment of the disclosure.

FIG. 5 is a schematic view of an arc discharge device processing an optical coupling module according to an embodiment of the disclosure. It is worth mentioning that unlike the conventional processing manner of continuous burning using oxyhydrogen flame, the embodiment uses an arc discharge device 50 (for example, a discharge rod) with high-frequency and intermittent characteristics for processing. The arc discharge device 50 is used to perform discharge according to different parameters for different processing processes. As shown in FIG. 5, the arc discharge device 50 provides a processing arc R to the optical coupling module 100 for processing.

Figure 6:
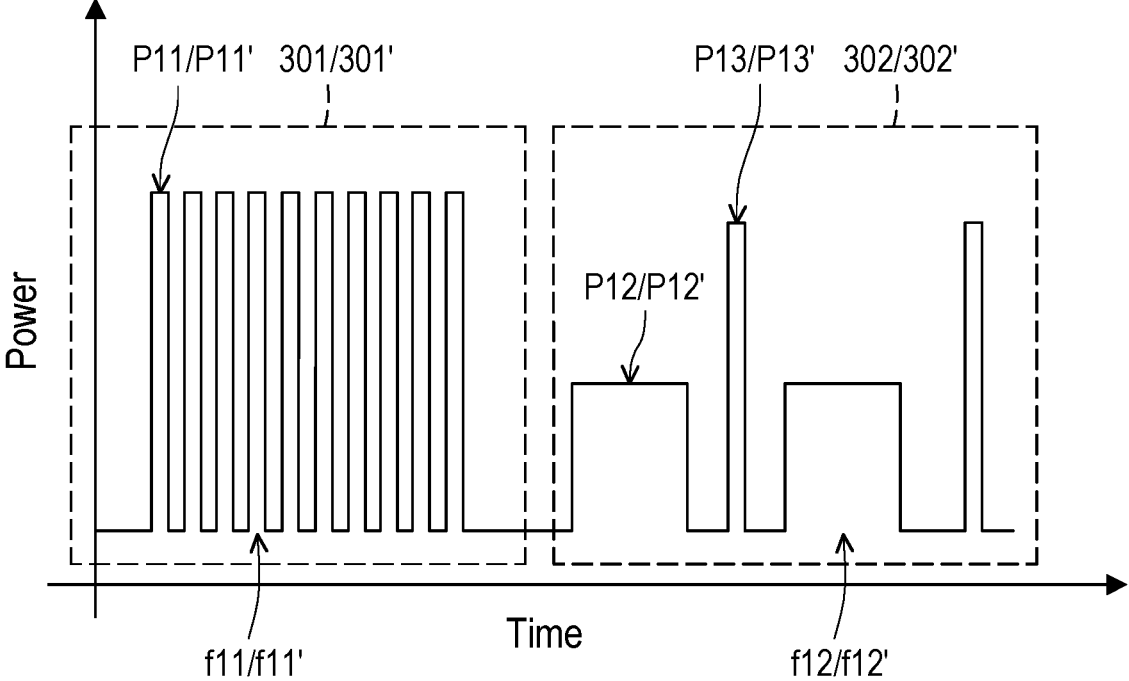
FIG. 6 is a discharge parameter diagram of an arc discharge device performing a stretching process on an optical coupling module according to an embodiment of the disclosure.

FIG. 6 is a discharge parameter diagram of an arc discharge device performing a stretching process on an optical coupling module according to an embodiment of the disclosure. Please refer to FIG. 6. Specifically, in Step S200 mentioned above, the method of stretching the transmission optical fiber 110 also includes providing a transmission stretching high-frequency arc to the transmission optical fiber 110 for melting and pre-stretching, and providing a transmission stretching intermittent arc to the transmission optical fiber 110 for stretching. Specifically, in the embodiment, the arc discharge device 50 sequentially provides the transmission stretching high-frequency arc and the transmission stretching intermittent arc, and the transmission stretching high-frequency arc and the transmission stretching intermittent arc may be respectively defined by different discharge powers and discharge frequencies. FIG. 6 respectively shows a power curve 301 of the transmission stretching high-frequency arc and a power curve 302 of the transmission stretching intermittent arc.

For example, in the embodiment, the transmission stretching high-frequency arc may be defined by a discharge power P11 and a discharge frequency f11, and the transmission stretching intermittent arc has a first discharge power P12 and a second discharge power P13 alternately changing with time, so the transmission stretching intermittent arc may be defined by the first discharge power P12, the second discharge power P13, and a discharge frequency f12. In the embodiment, the discharge powers of the transmission stretching high-frequency arc and the transmission stretching intermittent arc conform to P11>P13>P12, and the discharge frequencies conform to f11>f12, as shown in FIG. 6. That is, during the process of stretching, different stretching arcs generated by two different parameters are used for melting and stretching processing. In other words, the embodiment may perform different stages of the stretching processing process by the arc discharge device 50 to control the stretching degree of the transmission optical fiber 110, while obtaining a precise transmission taper slope, thereby improving the optical coupling effect of the optical coupling module 100.

Similarly, in Step S201 mentioned above, the method of stretching the at least one pump optical fiber 120 also includes providing a pump stretching high-frequency arc to the pump optical fiber 120 for melting and pre-stretching, and providing a pump stretching intermittent arc to the pump optical fiber 120 for stretching. Specifically, in the embodiment, the arc discharge device 50 sequentially provides the pump stretching high-frequency arc and the pump stretching intermittent arc, and the pump stretching high-frequency arc and the pump stretching intermittent arc may be respectively defined by different discharge powers and discharge frequencies. FIG. 6 respectively shows a power curve 301' of the pump stretching high-frequency arc and a power curve

302' of the pump stretching intermittent arc, wherein the power curve 301' of the pump stretching high-frequency arc may be the same as the power curve 301 of the transmission stretching high-frequency arc, and the power curve 302' of the pump stretching intermittent arc may be the same as the power curve 302 of the transmission stretching intermittent arc, but the disclosure is not limited thereto, and different power curves may be adjusted according to requirements. In other words, the embodiment may perform different stages of the stretching processing process by the arc discharge device 50 to control the stretching degrees of the transmission optical fiber 110 and the pump optical fiber 120, and improve the slope uniformity of the tapered portions of the transmission optical fiber 110 and the pump optical fiber 120, thereby improving the optical coupling efficiency of the optical coupling module 100.

For example, in the embodiment, the pump stretching high-frequency arc may be defined by a discharge power P11' and a discharge frequency f11', and the pump stretching intermittent arc has a first discharge power P12' and a second discharge power P13' alternately changing with time, so the pump stretching intermittent arc may be defined by the first discharge power P12', the second discharge power P13', and a discharge frequency f12'. In the embodiment, the discharge powers of the pump stretching high-frequency arc and the pump stretching intermittent arc conform to P11'>P13'>P12', and the discharge frequencies conform to f11'>f12', as shown in FIG. 6. That is, during the process of stretching, different stretching arcs generated by two different parameters are used for melting and stretching processing. In other words, the embodiment may perform different stages of the stretching processing process by the arc discharge device 50 to control the stretching degree of the pump optical fiber 120, while obtaining a precise pump taper slope, thereby improving the optical coupling effect of the optical coupling module 100.

Figure 7:
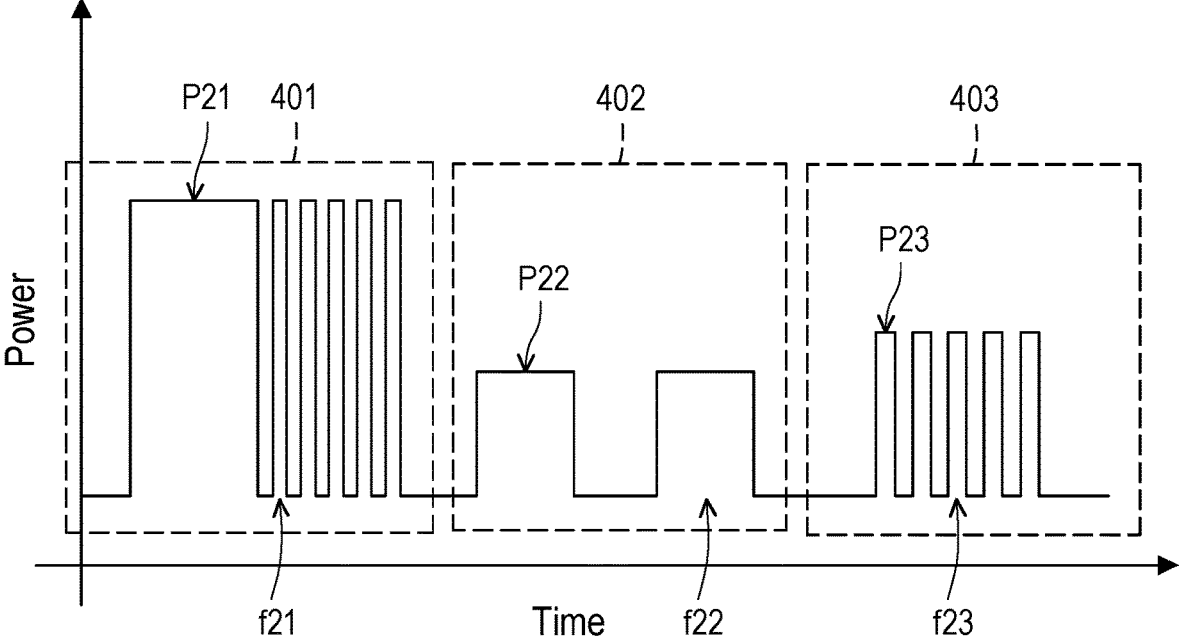
FIG. 7 is a discharge parameter diagram of an arc discharge device performing a splicing process on an optical coupling module according to an embodiment of the disclosure.

FIG. 7 is a discharge parameter diagram of an arc discharge device performing a splicing process on an optical coupling module according to an embodiment of the disclosure. Please continue to refer to FIG. 1 to FIG. 4 and FIG. 7. Step S202 is executed after executing Steps S200 and S201 mentioned above. Similar to Steps S200 and S201 mentioned above, in Step S202, the method for splicing the transmission optical fiber 110 and the at least one pump optical fiber 120 also includes a step of providing a splicing first high-frequency arc to the transmission optical fiber 110 and the at least one pump optical fiber 120 for melting, a step of providing a splicing intermittent arc to the transmission optical fiber 110 and the at least one pump optical fiber 120 for bonding, and a step of providing a splicing second high-frequency arc to the transmission optical fiber 110 and the at least one pump optical fiber 120 for annealing. Specifically, in the embodiment, the arc discharge device 50 sequentially provides the splicing first high-frequency arc, the splicing intermittent arc, and the splicing second high-frequency arc, wherein the splicing first high-frequency arc, the splicing intermittent arc, and the splicing second high-frequency arc may be respectively defined by different discharge powers and discharge frequencies. FIG. 7 respectively shows a power curve 401 of the splicing first high-frequency arc, a power curve 402 of the splicing intermittent arc, and a power curve 403 of the splicing second high-frequency arc.

For example, in the embodiment, the splicing first high-frequency arc may be defined by a discharge power P21 and a discharge frequency f21, the splicing intermittent arc may be defined by a discharge power P22 and a discharge frequency f22, and the splicing second high-frequency arc may be defined by a discharge power P23 and a discharge frequency f23. In the embodiment, the discharge powers of the splicing first high-frequency arc, the splicing intermittent arc, and the splicing second high-frequency arc conform to P21>P23>P22, and the discharge frequencies conform to f21>f23>f22, as shown in FIG. 7. That is, during the process of splicing, different splicing arcs generated by three different parameters are used for splicing processing. In other words, the embodiment may perform different stages of the splicing processing process by the arc discharge device 50 to control the splicing degrees of the transmission optical fiber 110 and the pump optical fiber 120, thereby improving the optical coupling effect of the optical coupling module 100. At the same time, except for the splicing portions, the transmission optical fiber 110 and the pump optical fiber 120 still maintain the same transmission taper slope and the same pump taper slope. Moreover, with the design of the bonding depth D, light leakage can be reduced by 30% to reduce the lateral light leakage, while also increasing the coupling area, thereby increasing the output laser energy density of the optical coupling module 100.

In summary, in the optical coupling module and the manufacturing method thereof of the disclosure, the transmission optical fiber and the at least one pump optical fiber are stretched along the longitudinal direction, and the pump tapered portion of the pump optical fiber and the transmission tapered portion of the transmission optical fiber are spliced, so that the outer surface with the smallest outer diameter in the pump tapered portion of the pump optical fiber has the bonding depth perpendicular to the longitudinal direction with an outer surface of a first transmission flat portion or the outer surface of the second transmission flat portion of the transmission optical fiber. In this way, the lateral light leakage can be reduced and the coupling area can be increased, thereby increasing the output laser energy density of the optical coupling module.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An optical coupling module, comprising:
  a transmission optical fiber, comprising:
    a center shaft extending along a longitudinal direction;
    a first transmission flat portion;
    a second transmission flat portion; and
    a transmission tapered portion, connected between the first transmission flat portion and the second transmission flat portion, wherein an average outer diameter of the transmission tapered portion is less than outer diameters of the first transmission flat portion and the second transmission flat portion respectively; and
  at least one pump optical fiber, extending along the longitudinal direction and comprising:
    a pump flat portion, disposed on the first transmission flat portion; and
    a pump tapered portion, connected to the pump flat portion, wherein a distance from an outer surface of the pump tapered portion to the center shaft gradually decreases from adjacent to the pump flat portion toward a direction away from the pump flat portion, wherein the pump tapered portion is spliced to the transmission tapered portion, and at a minimum distance from the outer surface of the pump tapered portion to the center shaft, the outer surface of the pump tapered portion has a bonding depth perpendicular to the longitudinal direction with an outer surface of the first transmission flat portion or an outer surface of the second transmission flat portion.

2. The optical coupling module according to claim 1, wherein the transmission tapered portion comprises a first tapered area, a second tapered area, and a flat area connected to the first tapered area and the second tapered area, and an outer diameter of the flat area is less than outer diameters of the first tapered area and the second tapered area respectively.

3. The optical coupling module according to claim 2, wherein the outer diameter of the first tapered area gradually decreases from the first transmission flat portion toward the flat area, and the outer diameter of the second tapered area gradually decreases from the second transmission flat portion toward the flat area.

4. The optical coupling module according to claim 1, wherein there is no spacing between the pump tapered portion and the transmission tapered portion.

5. The optical coupling module according to claim 1, wherein a number of the at least one pump optical fiber is plurality, wherein the pump optical fibers are evenly distributed on an outer surface of the transmission optical fiber in a direction perpendicular to the longitudinal direction.

6. The optical coupling module according to claim 1, wherein the bonding depth is less than or equal to 50 μm.

7. The optical coupling module according to claim 1, wherein a length of the pump tapered portion in the longitudinal direction is greater than a length of the transmission tapered portion in the longitudinal direction.

8. The optical coupling module according to claim 1, wherein an outer surface of the transmission tapered portion has a transmission taper slope.

9. The optical coupling module according to claim 1, wherein the outer surface of the pump tapered portion has a pump taper slope.

10. A manufacturing method of an optical coupling module, comprising:
  a transmission stretching step of stretching a transmission optical fiber along a longitudinal direction;
  a pump stretching step of stretching at least one pump optical fiber along the longitudinal direction; and
  a splicing step of splicing the transmission optical fiber and the at least one pump optical fiber, so that a pump tapered portion of the at least one pump optical fiber is spliced to a transmission tapered portion of the transmission optical fiber, wherein at a minimum distance from an outer surface of the pump tapered portion to a center shaft of the transmission optical fiber, the outer surface of the pump tapered portion forms a bonding depth perpendicular to the longitudinal direction with an outer surface of a first transmission flat portion or an outer surface of a second transmission flat portion of the transmission optical fiber.

11. The manufacturing method of the optical coupling module according to claim 10, wherein the transmission stretching step comprises:
  providing a transmission stretching high-frequency arc to the transmission optical fiber for melting and pre-stretching; and
  providing a transmission stretching intermittent arc to the transmission optical fiber for stretching.

12. The manufacturing method of the optical coupling module according to claim 11, wherein a discharge power of the transmission stretching high-frequency arc is P11, the transmission stretching intermittent arc has a first discharge power and a second discharge power alternately changing with time, the first discharge power is P12, and the second discharge power is P13, where P11>P13>P12.

13. The manufacturing method of the optical coupling module according to claim 11, wherein a discharge frequency of the transmission stretching high-frequency arc is f11, and a discharge frequency of the transmission stretching intermittent arc is f12, where f11>f12.

14. The manufacturing method of the optical coupling module according to claim 10, wherein the pump stretching step comprises:

providing a pump stretching high-frequency arc to the at least one pump optical fiber for melting and pre-stretching; and providing a pump stretching intermittent arc to the at least one pump optical fiber for stretching.

15. The manufacturing method of the optical coupling module according to claim 14, wherein a discharge power of the pump stretching high-frequency arc is P11', the pump stretching intermittent arc has a first discharge power and a second discharge power alternately changing with time, the first discharge power is P12', and the second discharge power is P13', where P11'>P13'>P12'.

16. The manufacturing method of the optical coupling module according to claim 14, wherein a discharge frequency of the pump stretching high-frequency arc is f11', and a discharge frequency of the pump stretching intermittent arc is f12', where f11'>f12'.

17. The manufacturing method of the optical coupling module according to claim 16, wherein a discharge frequency of the splicing first high-frequency arc is f21, a discharge frequency of the splicing intermittent arc is f22, and a discharge frequency of the splicing second high-frequency arc is f23, where f21>f23>f22.

18. The manufacturing method of the optical coupling module according to claim 10, wherein the splicing step comprises:

providing a splicing first high-frequency arc to the transmission optical fiber and the at least one pump optical fiber for melting;

providing a splicing intermittent arc to the transmission optical fiber and the at least one pump optical fiber for bonding; and providing a splicing second high-frequency arc to the transmission optical fiber and the at least one pump optical fiber for annealing.

19. The manufacturing method of the optical coupling module according to claim 18, wherein a discharge power of the splicing first high-frequency arc is P21, a discharge power of the splicing intermittent arc is P22, and a discharge power of the splicing second high-frequency arc is P23, where P21>P23>P22.

* * * * *